(12) United States Patent
Sugiura

(10) Patent No.: US 10,900,639 B2
(45) Date of Patent: Jan. 26, 2021

(54) GUIDE LIGHT IRRADIATION DEVICE

(71) Applicant: TOPCON CORPORATION, Tokyo (JP)

(72) Inventor: Akinobu Sugiura, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 0 days.

(21) Appl. No.: 16/817,060

(22) Filed: Mar. 12, 2020

(65) Prior Publication Data

US 2020/0309350 A1  Oct. 1, 2020

(30) Foreign Application Priority Data

Mar. 29, 2019 (JP) ................. 2019-067256

(51) Int. Cl.
| | | |
|---|---|---|
| *F21V 13/04* | (2006.01) | |
| *F21V 5/00* | (2018.01) | |
| *F21V 7/00* | (2006.01) | |
| *G01C 15/00* | (2006.01) | |
| *G01C 15/12* | (2006.01) | |

(52) U.S. Cl.
CPC ............. *F21V 13/04* (2013.01); *F21V 5/00* (2013.01); *F21V 7/00* (2013.01); *G01C 15/004* (2013.01); *G01C 15/12* (2013.01)

(58) Field of Classification Search
None
See application file for complete search history.

(56) References Cited

U.S. PATENT DOCUMENTS

| | | | | |
|---|---|---|---|---|
| 9,188,674 B2 * | 11/2015 | Suzuki | ................. | G01S 7/4817 |
| 2012/0242830 A1 | 9/2012 | Kumagai et al. | | |
| 2013/0229645 A1 * | 9/2013 | Suzuki | ................... | G01S 17/02 |
| | | | | 356/5.01 |
| 2015/0092193 A1 * | 4/2015 | Hotta | ................... | G01N 21/55 |
| | | | | 356/445 |

FOREIGN PATENT DOCUMENTS

| | | | | |
|---|---|---|---|---|
| EP | 2503284 A2 * | 9/2012 | .......... | G01C 15/002 |
| JP | 2012-202821 | 10/2012 | | |

* cited by examiner

*Primary Examiner* — Ashok Patel
(74) *Attorney, Agent, or Firm* — Roberts Calderon Safran & Cole P.C.

(57) ABSTRACT

A guide light irradiation device to irradiate guide light to indicate a direction to a survey operator, includes a plurality of irradiators configured to each irradiate guide light differing in pattern between the left and the right of an irradiation direction as a center, the plurality of irradiators are juxtaposed in the up-down direction, and are disposed so that irradiation directions of the respective irradiators match in the horizontal direction, and make a predetermined angle with each other in the vertical direction. Synthetic light of guide lights irradiated from the respective irradiators has brightness as a sum of brightnesses of light sources of the respective irradiators, and has a fan shape extending in the vertical direction. A distance from which light is visually recognized is long, and guide light is easily found even at a location with level differences.

7 Claims, 7 Drawing Sheets

GUIDE LIGHT IRRADIATION DEVICE

TECHNICAL FIELD

The present invention relates to a guide light irradiation device to irradiate guide light for guiding a survey operator.

BACKGROUND ART

Conventionally, a guide light irradiation device that indicates, on a survey site, a piling point to a survey operator holding a surveying pole by irradiating guide light is known. For example, in Patent Literature 1, light-emitting diodes are turned on in colors different between the left and the right of a boundary set to a collimation axis within a horizontal plane, and a survey operator is guided to a position at which left and right guide lights in different colors are equally viewable so that the operator can quickly move to the neighborhood of a survey setting point as a target point. A fan-shaped laser beam extending long in the up-down direction is used as guide light, and the guide light is easily found even on a survey site with level differences.

CITATION LIST

Patent Literature

[Patent Literature 1] Japanese Published Unexamined Patent Application Publication No. 2012-202821

SUMMARY OF THE INVENTION

Technical Problem

However, fan-shaped guide light extending in the up-down direction is created by expanding a guide light irradiation range in the up-down direction by using a cylindrical lens in a guide light irradiation optical system, and this poses a problem in which a guide light reach distance (distance at which a survey operator can visually recognize the guide light) is shortened by diffusion of the guide light.

The present invention was made in view of this problem, and provides a guide light irradiation device with an extended guide light reach distance and a guide light irradiation range expanded in the up-down direction.

Solution to Problem

Therefore, in an aspect of the present invention, a guide light irradiation device to irradiate guide light to indicate a direction to a survey operator includes a plurality of irradiators configured to each irradiate guide light differing in pattern between the left and the right of an irradiation direction as a center, and the plurality of irradiators are juxtaposed in the up-down direction and configured so that synthetic light of guide lights irradiated from the respective irradiators is irradiated as synthetic guide light.

With this configuration, guide lights are irradiated from the respective irradiators arranged in the up-down direction, and are recognized from a distance as synthetic guide light that is a sum of brightnesses of the respective light sources, so that a guide light reach distance can be lengthened, and due to the arrangement in the up-down direction, a guide light irradiation range can be extended in the up-down direction.

According to a certain aspect, each of the irradiators includes a pair of light sources configured to respectively emit lights for left and right patterns of the guide light, an optical member configured to form lights emitted from the pair of light sources as light differing in pattern between the left and the right, and a condenser lens configured to make the guide light exit. In this aspect, the irradiators can irradiate guide light as light that differs between the left and the right.

According to a certain aspect, the plurality of irradiators are disposed so that their irradiation directions match in the horizontal direction, and make a predetermined angle with each other in the vertical direction. In this aspect, a light irradiation range in the up-down direction can be extended.

In a certain aspect, the predetermined angle between irradiation directions of the plurality of irradiators is configured to be smaller than a light diffusion angle in the vertical direction in a single one of the irradiators. With this configuration, generation of a gap that is not covered by irradiation ranges of two guide lights can be prevented.

In a certain aspect, a distance in the vertical direction between light emitting units of the plurality of irradiators the irradiation directions of which make the predetermined angle with each other is configured so that an angle between line segments from a point at an assumed use distance of the guide light irradiation device from the guide light irradiation device to the respective light emitting units becomes 1 arc-minute or less. In this aspect, in a range in which irradiation ranges overlap, lights irradiated from the respective light sources are viewed as being summed, so that the guide light reach distance is extended. Accordingly, an effect of enabling the device to be used even on a survey site with great level differences and guide light to be easily found, is obtained.

In a certain aspect, respective condenser lenses of the plurality of irradiators are configured as a shared single one. In this aspect, by sharing a component, the number of components can be reduced, and the device can be entirely reduced in size.

In a certain aspect, respective optical members of the plurality of irradiators are configured as a shared single one. In this aspect, it is not necessary to match color boundary directions of the respective guide lights, so that the adjustment becomes unnecessary.

Effect of Invention

As is clear from the description above, according to the present invention, the guide light reach distance is extended, and guide light extending in the up-down direction is irradiated.

BRIEF DESCRIPTION OF THE DRAWINGS

FIG. 2A is a horizontal sectional view of the irradiator, and FIG. 2B is a side view.

FIG. 3A is a perspective view, FIG. 3B is a front view, and FIG. 3C is a left side view.

FIG. 5A is a perspective view, FIG. 5B is a front view, and FIG. 5C is a left side view.

DESCRIPTION OF EMBODIMENTS

Hereinafter, detailed embodiments of the present invention will be described with reference to the drawings. The embodiments do not limit the invention but are illustrations of the invention, and all features and combinations of the features described in the embodiments are not always essential for the present invention.

(Outline of Invention)

Figure 1:
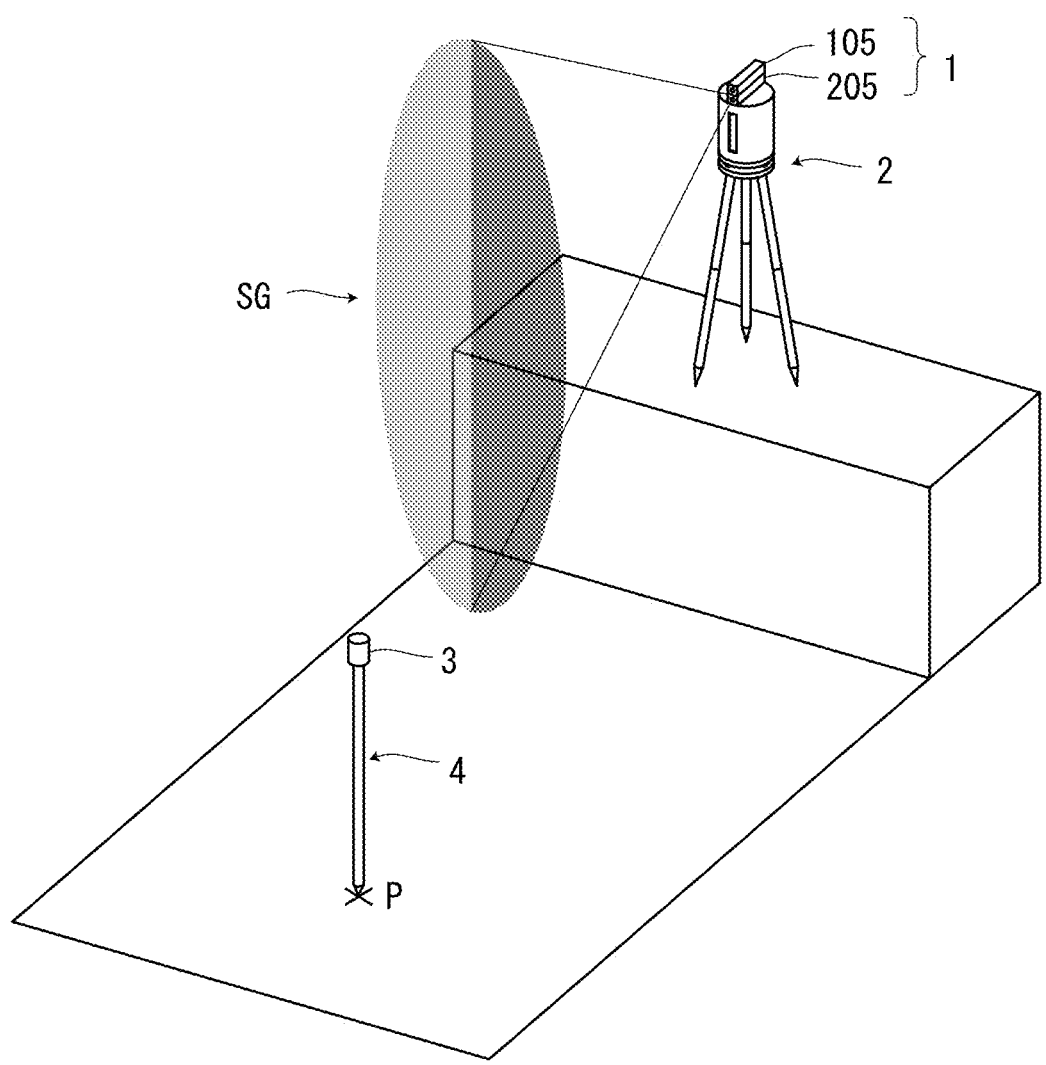
FIG. 1 is a schematic perspective view to illustrate an outline of a guide light irradiation device according to the present invention.

FIG. 1 is a schematic perspective view to illustrate an outline of a guide light irradiation device 1 according to the present invention. The guide light irradiation device 1 is a device capable of irradiating synthetic guide light SG consisting of lights different in pattern between the left and the right of a center, and is equipped in a total station 2 having a distance and angle measuring function.

The guide light irradiation device 1 includes irradiators 105 and 205 juxtaposed in the up-down direction. Synthetic light of lights respectively irradiated from the irradiators 105 and 205 is irradiated as the synthetic guide light SG from the guide light irradiation device 1. An irradiation direction of the synthetic guide light SG and a collimation direction of the total station 2 are configured so as to match in the horizontal direction, so that fan-shaped synthetic guide light SG that differs in pattern between the left and the right of a collimation axis of the total station 2 as a boundary on a horizontal plane, and extends in the up-down direction, is irradiated.

As a usage, first, the total station 2 is installed at a known point and collimated in a direction toward a piling point P, and irradiates the synthetic guide light SG by the guide light irradiation device 1. An operator who holds a pole 4 equipped with a prism 3 as a target of the total station 2 can determine which side the operator should move to, the left or the right by himself/herself according to a pattern of the synthetic guide light SG viewable from the guide light irradiation device 1. For example, in the present embodiment, the synthetic guide light SG is configured so that, as viewed from an operator side, red light is viewed at the right side, and green light is viewed at the left side. Therefore, when the operator recognizes red light, the operator is on the right side relative to the piling point P. Accordingly, it is only necessary to face the total station 2 and move leftward from a current location. In this way, an operator is guided to a collimation direction of the total station 2 that is a direction in which left and right colors of the synthetic guide light SG are equally viewable. After direction guidance to the piling point P is made, the piling point P can be set by measuring the distance of the prism 3 at the total station 2 and confirming the distance.

The synthetic guide light SG is light extending long in the vertical direction, so that even when there is a level difference between the installation position of the total station 2 and the piling point P as illustrated in FIG. 1, an operator can confirm the synthetic guide light SG. The synthetic guide light SG is high in luminosity, and a range of use of the guide light irradiation device 1 (distance and range in which an operator can visually recognize the synthetic guide light SG) is comparatively large. The synthetic guide light SG is bright, and a range in which the synthetic guide light SG is visually recognized is large, so that an operator can easily find the synthetic guide light SG.

For the synthetic guide light SG, lights in various patterns can be used such as, in addition to lights in colors different between the left and the right, a combination one of which being blinking light and the other being continuous light, or lights different in blinking period between the left and the right.

First Embodiment

Figure 2A:
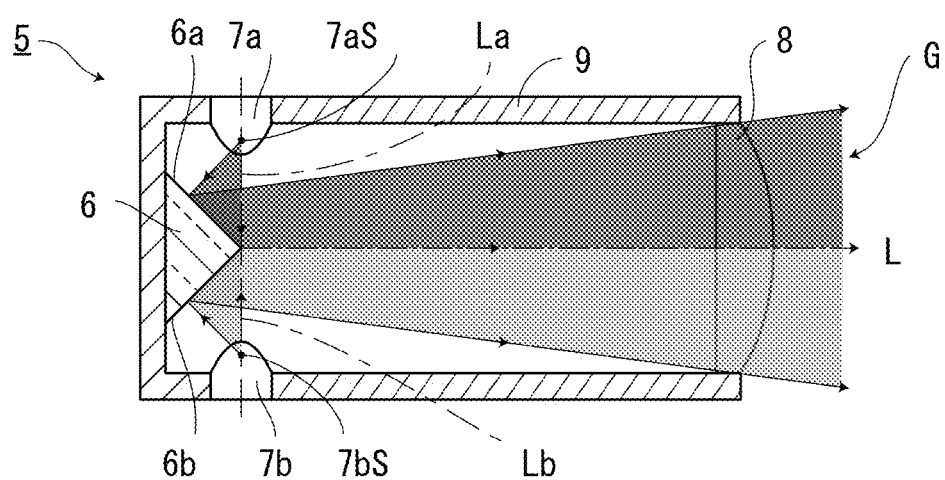
FIGS. 2A and 2B are explanatory views to describe a basic configuration of an irradiator as an irradiation function of the guide light irradiation device.
Figure 2B:
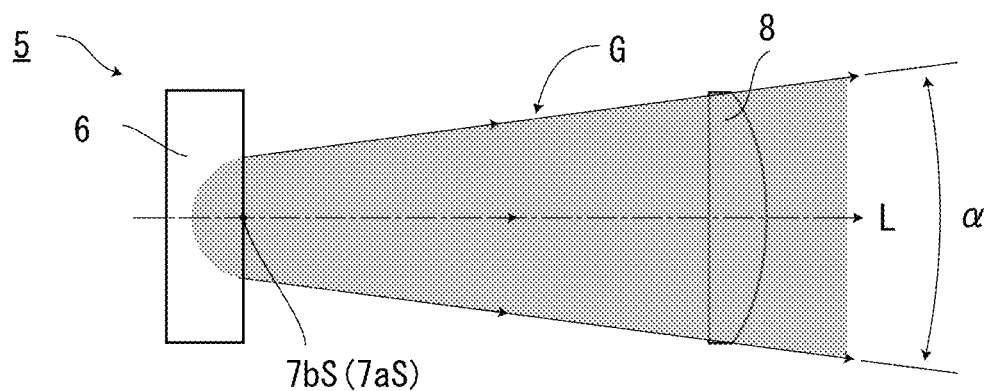

Before describing a configuration of a guide light irradiation device 1 according to a first embodiment, first, an irradiator 5 having a basic configuration of a light irradiation mechanism is described with reference to the drawings. FIGS. 2A and 2B illustrate an irradiator 5, and FIG. 2A is a horizontal sectional view of the irradiator 5, and FIG. 2B is a side view to illustrate irradiation light (guide light) of the irradiator 5. In FIGS. 2A and 2B, irradiation light is colored to describe a state of the guide light. In FIG. 2B, light-emitting diodes 7a and 7b are omitted and only light sources 7aS and 7bS are illustrated, and the housing is also omitted (the same applies to FIG. 4, FIG. 6, FIG. 7, FIG. 8, and FIG. 9 described later). Dispositions of the light sources 7aS and 7bS match in a side view, so that one disposed at the rear side is expressed using parentheses. In FIGS. 2A and 2B, each angle does not reflect an actual ratio, and the configuration is schematically illustrated (the same applies to FIG. 3 to FIG. 9 described later).

As illustrated in FIG. 2A, the irradiator 5 includes, as optical systems, a pair of light-emitting diodes 7a and 7b, a right-angle mirror 6, and a lens 8 that is a collimating lens as a condenser lens. These optical systems are held in a housing 9.

The right-angle mirror 6 has reflecting surfaces 6a and 6b, and they make a right angle with each other. The lens 8 is fixed to a tip end opening of the box-shaped housing 9, and the right-angle mirror 6 is disposed so that a ridge of the reflecting surfaces 6a and 6b matches a vertical line passing through a rear focal point of the lens 8 on an optical axis L of the lens 8. The reflecting surfaces 6a and 6b face the lens 8 side, and tilt at equal angles in directions opposite to the optical axis L. The red light-emitting diode 7a is disposed on a reflecting optical axis La of one reflecting surface 6a, and the green light-emitting diode 7b is disposed on a reflecting optical axis Lb of the other reflecting surface 6b, respectively. Red light irradiated from the light source 7aS of the red light-emitting diode 7a is reflected by the reflecting surface 6a, and green light irradiated from the light source 7bS of the green light-emitting diode 7b is reflected by the reflecting surface 6b, respectively, and are irradiated as guide light G from the lens 8 while being divided into two emission colors by the vertical line at the optical axis L.

As illustrated in FIG. 2B, the guide light G that has exited from the lens 8 is irradiated forward in an irradiation direction set to the optical axis L while being diffused at a diffusion angle (expansion angle) a in the vertical direction.

An apex of the right-angle mirror 6 is disposed at an image forming position (rear focal point) when looking into the lens 8 from a distance, so that a boundary between the red light and the green light can be projected sharply and clearly.

Figure 3A:
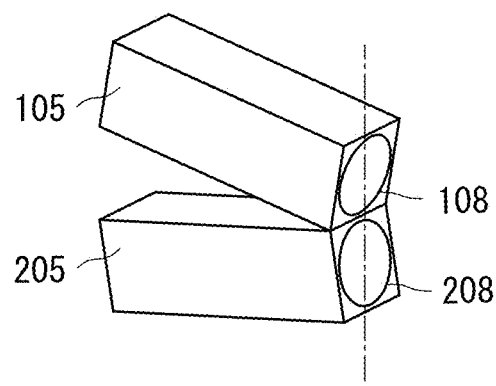
FIGS. 3A, 3B, and 3C illustrate a guide light irradiation device according to a first embodiment, and are explanatory views to describe dispositions of irradiators.
Figure 3B:
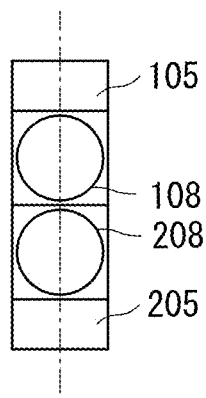
Figure 3C:
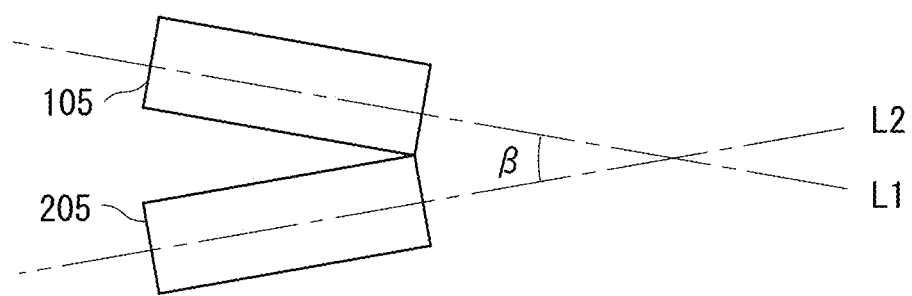
Figure 4:
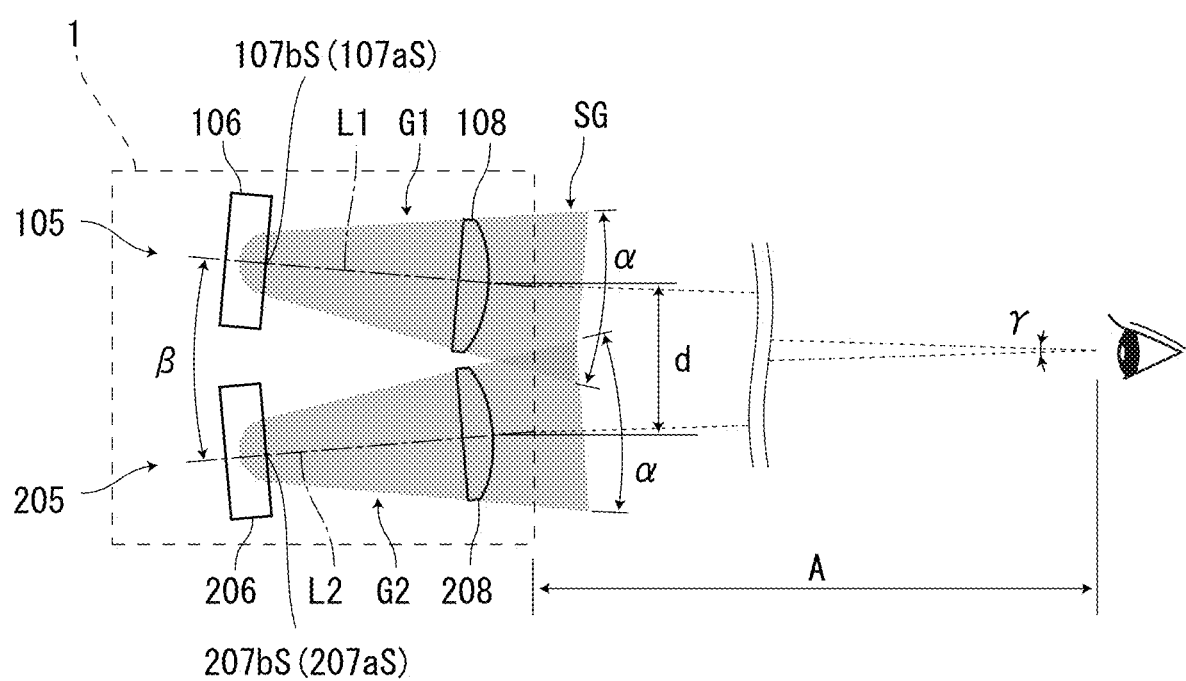
FIG. 4 is a schematic left side view of the same guide light irradiator, being an explanatory view to describe a state of irradiation lights and dispositions of components.

The guide light irradiation device 1 includes two irradiators 105 and 205 each having the above-described configuration. FIGS. 3A, 3B, and 3C are layout drawings to describe dispositions of the respective irradiators, and FIG. 3A is a perspective view, FIG. 3B is a front view, and FIG. 3C is a left side view. FIG. 4 is a schematic left side view to describe a state of irradiation lights and dispositions of components of the guide light irradiation device 1.

As illustrated in FIGS. 3A, 3B, and 3C, the irradiators 105 and 205 are arranged one above the other by disposing the irradiator 105 at the upper side and the irradiator 205 at the lower side while tilting the end portion sides with the lenses 108 and 208 close to each other so that optical axes L1 and L2 as irradiation directions of the irradiators 105 and 205 match in the horizontal direction, and make a predetermined angle β with each other in the vertical direction.

As illustrated in FIG. 4, the irradiator 105 has the same configuration as in FIG. 2, and has a right-angle mirror 106 disposed on an optical axis L1 of a lens 108, lights emitted from light sources 107aS and 107bS are formed as guide light G1 that differs in pattern between the left and the right of a vertical axis by the right-angle mirror 106, and the guide light G1 is irradiated forward in an irradiation direction set to the optical axis L1 from the lens 108.

The irradiator 205 is also configured in the same manner, and has a right-angle mirror 206 disposed on an optical axis L2 of a lens 208, and lights emitted from light sources 207aS and 207bS are formed as guide light G2 that differs in pattern between the left and the right of a vertical axis by the right-angle mirror 206, and the guide light G2 is irradiated forward in an irradiation direction set to the optical axis L2 from the lens 208.

The dispositions are adjusted so that an angle β in the vertical direction between the irradiators 105 and 205 becomes smaller than a light diffusion angle c of a single irradiator 105, 205 in the vertical direction. By adjusting the dispositions in this manner, generation of a gap that is not covered by irradiation ranges of the irradiators 105 and 205 can be prevented.

Here, a disposition distance d between the irradiators 105 and 205 (distance between centers of the lenses 108 and 208) is set so that, on the assumption that an assumed use distance of the guide light irradiation device 1 is defined as an assumed use distance A, an angle $\gamma(\gamma=\tan^{-1}(d/A)*180/\pi)$ between line segments from a point at the assumed use distance A from the device to the centers of the lenses 108 and 208 becomes 1 arc-minute (1/60 degrees) or less. This is because, since an angle resolution (visual angle) of a human eye having 20/20 vision is 1 arc-minute, when a plurality of light sources are present in a range of a visual angle of 1 arc-minute or less, the light sources are viewed as not individual light sources but one light source as a sum of brightnesses of the respective light sources viewed singly. That is, by setting the angle γ to 1 arc-minute or less, lights irradiated from the irradiators 105 and 205 are viewed as being summed for an operator, and an effect of extending a reach distance of the synthetic guide light SG to be longer than the guide light G1 of a single irradiator 105 is obtained. Further, two irradiators are arranged in the up-down direction and irradiate lights upward and downward, so that the synthetic guide light SG extends to be vertically longer than the guide light G1, and this enables use at a location with level differences, and enables the synthetic guide light SG to be easily found.

The assumed use distance A is determined according to specifications such as a reach limit distance of the synthetic guide light SG determined from luminances of light-emitting diodes and lenses to be used, and use conditions such as a requested permissible level difference.

Second Embodiment

Figure 5A:
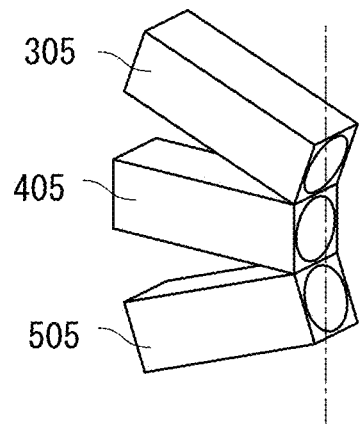
FIGS. 5A, 5B, and 5C illustrate a guide light irradiation device according to a second embodiment, and are explanatory views to describe dispositions of irradiators.
Figure 5B:
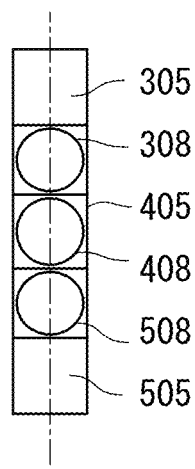
Figure 5C:
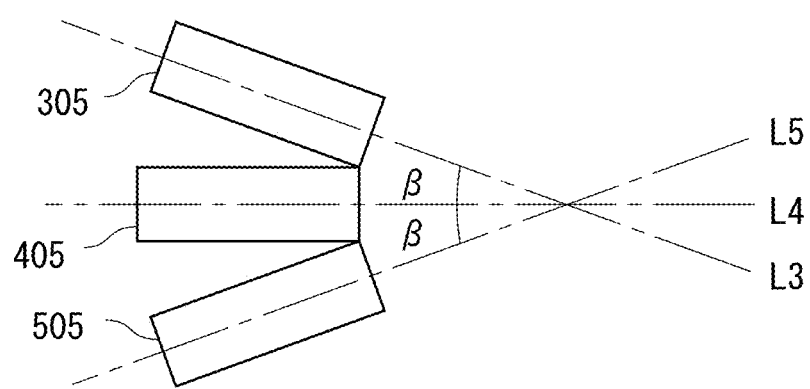
Figure 6:
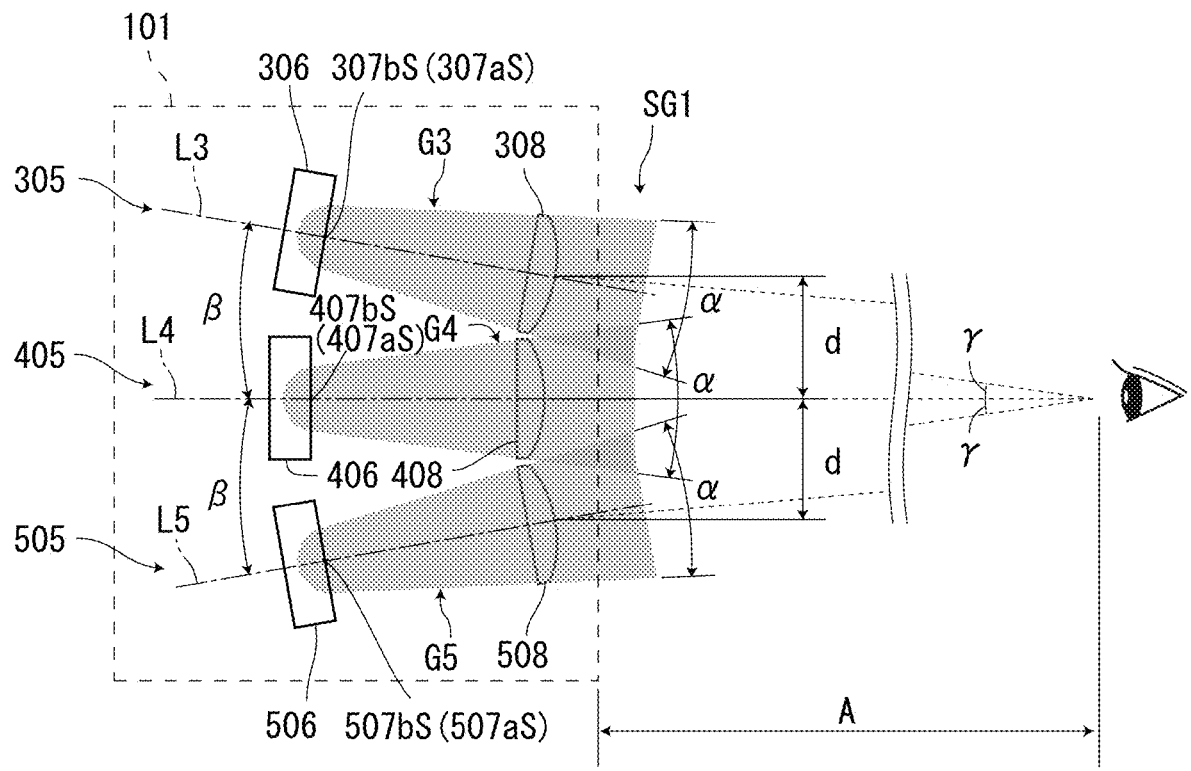
FIG. 6 is a schematic side view of the same guide light irradiation device.

FIGS. 5A, 5B, and 5C are layout drawings to describe dispositions of irradiators to be equipped in a guide light irradiation device 101 according to a second embodiment, and FIG. 5A is a perspective view, FIG. 5B is a front view, and FIG. 5C is a left side view. FIG. 6 is a schematic left side view to describe a state of irradiation lights of the guide light irradiation device 101 and dispositions of components.

As illustrated in FIGS. 5A, 5B, and 5C, the guide light irradiation device 101 includes three irradiators 305, 405, and 505 juxtaposed in the up-down direction.

Even when the number of irradiators becomes three or more, as in the first embodiment, the irradiators 305, 405, and 505 are juxtaposed in the up-down direction in the order of irradiators 305, 405, and 505 from the upper side while tilting the end portion sides with lenses 308, 408, and 508 close to each other so that optical axes L3, L4, and L5 as irradiation directions of the irradiators 305, 405, and 505 match each other in the horizontal direction, and optical axes of the irradiators adjacent to each other (L3 and L4, L4 and L5) make a predetermined angle β with each other in the vertical direction.

As illustrated in FIG. 6, the irradiator 305 includes a pair of light sources 307aS and 307bS, a right-angle mirror 306, and the lens 308, the irradiator 405 includes a pair of light sources 407aS and 407bS, a right-angle mirror 406, and the lens 408, and the irradiator 505 includes a pair of light sources 507aS and 507bS, a right-angle mirror 506, and the lens 508, respectively configured in the same manner as in FIG. 2A and FIG. 2B.

Synthetic light of guide lights G3, G4, and G5 irradiated from the respective irradiators 305, 405, and 505 becomes synthetic guide light SG1 of the guide light irradiation device 101. Irradiation directions of the respective guide lights are directions of the respective optical axes, and the predetermined angle β in the vertical direction is configured so as to become equal to or less than a diffusion angle α in the vertical direction, and therefore, a gap that is not covered by the synthetic guide light SG1 is not generated.

As in the first embodiment, a disposition distance d between irradiators adjacent to each other is also configured so that an angle γ between line segments from the assumed use distance A to lens centers becomes equal to or less than 1 arc-minute.

The Synthetic guide light SG1 irradiated from the guide light irradiation device 101 is visually recognized as one light obtained by summing brightnesses of the respective light sources as viewed from the assumed use distance A.

Since the three irradiators 305, 405, and 505 are used, luminosity of the synthetic guide light SG1 is viewed to be higher than luminosity of the guide light G in the case of using a single irradiator 5 and luminosity of the synthetic guide light SG made by two irradiators in the first embodiment, and as compared with these cases, the guide light irradiation device 101 can extend its use distance longer. The synthetic guide light SG1 can be extended longer in the up-down direction than in the embodiment described above, so that the device can be widely used even at locations with level differences, etc.

Third Embodiment

Figure 7:
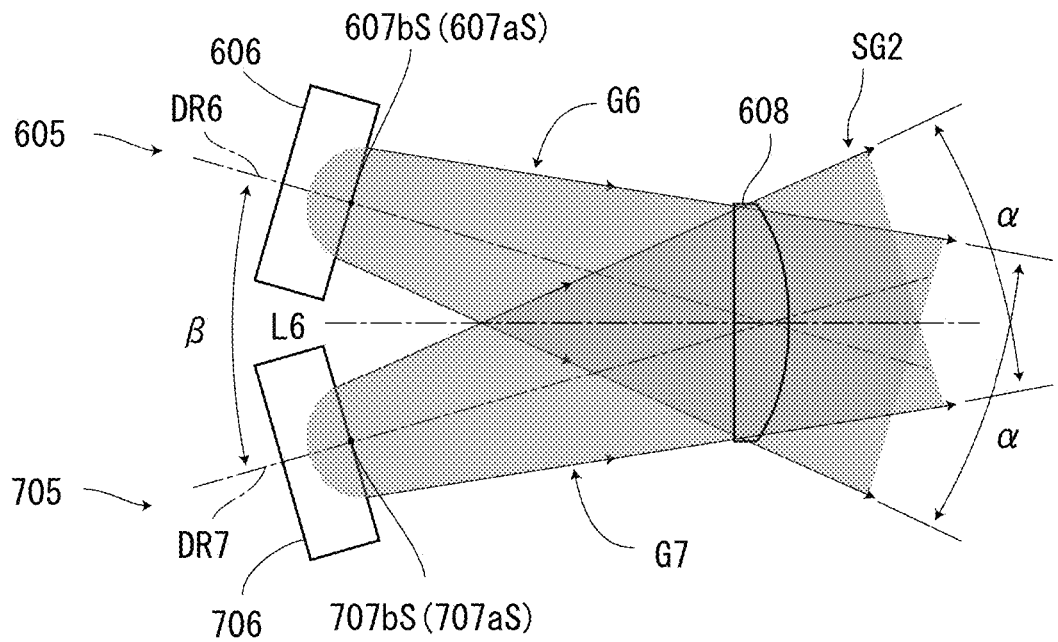
FIG. 7 is a schematic side view of a guide light irradiation device according to a third embodiment.

FIG. 7 is a schematic side view illustrating a configuration of a guide light irradiation device 201 according to a third embodiment. The guide light irradiation device 201 includes two irradiators 605 and 705 arranged in the up-down direction as in the first embodiment. In the irradiators 605 and 705, two pairs of light sources 607aS and 607bS, 707aS and 707bS, and two right-angle mirrors 606 and 706, are included, however, as a difference from the first embodiment, the lenses are unified and only one shared lens 608 is used.

The light sources and the right-angle mirrors are disposed in the same manner as in the first embodiment, and in the irradiator 605, lights emitted from the pair of light sources 607aS and 607bS are reflected by the right-angle mirror 606, and guide light G6 that differs in pattern between the left and the right of a boundary set in the vertical direction is formed, and in the irradiator 705, lights emitted from the pair of light sources 707aS and 707bS are reflected in the same manner by the right-angle mirror 706, and guide light G7 patterned in the same manner as the guide light G6 is formed. The right-angle mirrors 606 and 706 are disposed so that ridges of the mirrors match a vertical plane including an optical axis L6 of the lens 608. The right-angle mirrors 606 and 706 and respective corresponding light sources are disposed vertically symmetrically about a central axis of the lens 608.

Both of the guide lights G6 and G7 enter the single lens 608 and exit forward as synthetic guide light SG2 from the surface of the lens.

The guide light G6 formed by the right-angle mirror 606 disposed higher than the center of the lens 608 enters the lens 608 from a side slightly higher than the front as a whole, and is irradiated while tilting downward at a gentle angle from the surface of the lens 608. Similarly, the guide light G7 formed by the right-angle mirror 706 disposed lower than the center of the lens 608 enters the lens 608 from a side slightly lower than the front, and is irradiated while tilting upward at a gentle angle from the surface of the lens 608.

Irradiation directions DR6 and DR7 that are exit directions of the guide lights G6 and G7 of the irradiators 605 and 705 from the lens 608, and further, the optical axis L6, cross each other at the center of the lens 608. That is, dispositions of the irradiators 605 and 705 are adjusted so that guide lights G6 and G7 of the irradiators pass through the center of the lens 608. As in other embodiments, an angle β between the irradiation directions DR6 and DR7 is configured to be smaller than light diffusion angles α of the respective guide lights G6 and G7 in the vertical direction.

In the first embodiment, each irradiator includes a lens, however, in the present embodiment, the lenses are unified, and the guide light irradiation device 201 includes only a single lens 608. With this configuration, a disposition distance d (refer to FIG. 4 and FIG. 6) as a lens-to-lens distance can be set to 0, and the device can be reduced in size and simplified by reducing in the number of components.

Fourth Embodiment

Figure 8:
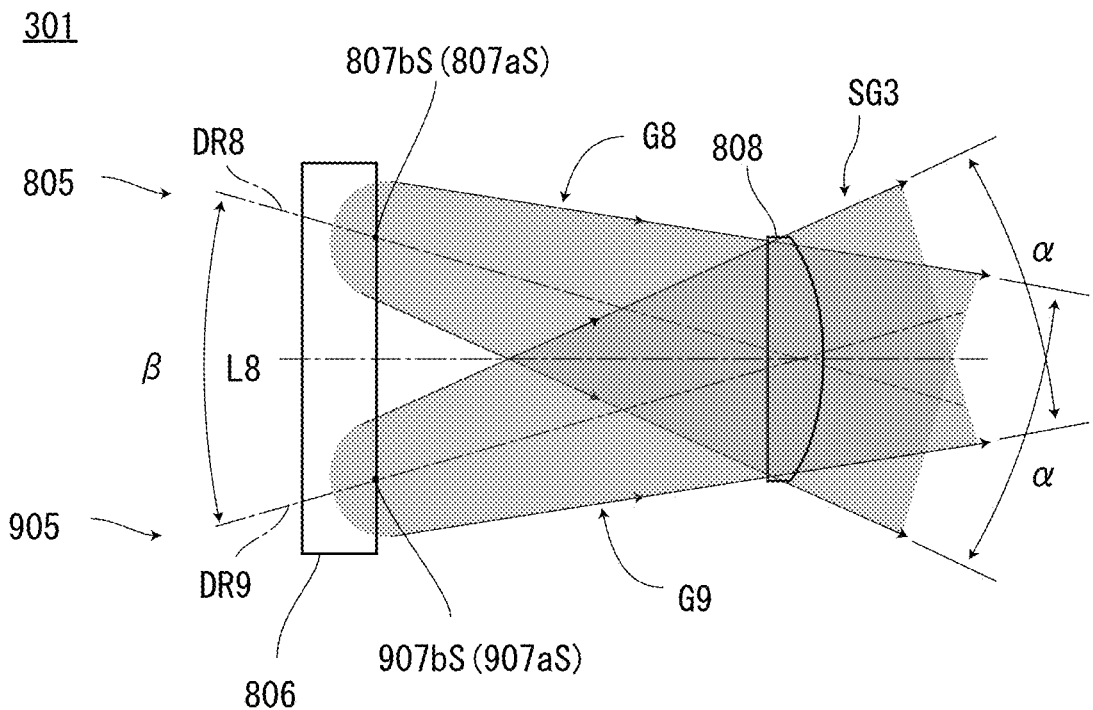
FIG. 8 is a schematic side view of a guide light irradiation device according to a fourth embodiment.

FIG. 8 is a schematic side view illustrating a configuration of a guide light irradiation device 301 according to a fourth embodiment. The guide light irradiation device 301 includes two irradiators 805 and 905 arranged in the up-down direction. Although the irradiators 805 and 905 respectively include a pair of light sources 807aS and 807bS and a pair of light sources 907aS and 907bS, they use a shared single lens 808 and a shared single right-angle mirror 806. In addition to sharing of a lens by the two irradiators in the third embodiment, a right-angle mirror is also shared.

The right-angle mirror 806 is disposed so that its ridge matches a vertical line at a rear focal point of the lens 808 on an optical axis L8 of the lens 808.

The pair of light sources 807aS and 807bS and the pair of light sources 907aS and 907bS of the irradiators 805 and 905 arranged one above the other, are disposed vertically symmetrically about a central horizontal plane of the lens 808 as an axis. It is preferable that lens shapes of diodes of these light sources are adjusted or the light sources are tilted from the horizontal direction while directly facing each other so that lights reflected by the right-angle mirror 806 turns slightly downward/upward with respect to the optical axis L8.

Lights emitted from the pair of light sources 807aS and 807bS of the irradiator 805 disposed at the upper side are reflected by an upper portion of the right-angle mirror 806, and guide light G8 is formed. The guide light G8 enters the lens 808 at a downward angle as a whole. Similarly, lights emitted from the pair of light sources 907aS and 907bS of the irradiator 905 disposed at the lower side are reflected by a lower portion of the right-angle mirror, and guide light G9 is formed. The guide light G9 enters the lens 808 at an upward angle as a whole.

Irradiation directions DR8 and DR9 as exit directions of the guide lights G8 and G9 of the irradiators 805 and 905 from the lens 808, and further, the optical axis L8, cross each other at the center of the lens 808. That is, dispositions of the irradiators 805 and 905 are adjusted so that guide lights G8 and G9 of the irradiators pass through the center of the lens 808. Synthetic light of the guide lights G8 and G9 is irradiated as synthetic guide light SG3.

As in other embodiments, an angle β between the irradiation directions DR8 and DR9 of the guide lights G8 and G9 of the irradiators 805 and 905 is configured to be smaller than light diffusion angles α of the respective guide lights G8 and G9 in the vertical direction.

In a case where a plurality of irradiators are juxtaposed in the vertical direction, they need to be adjusted so that boundary directions (in horizontal direction) of the respective guide lights match each other, however, in the present embodiment, right-angle mirrors of the respective irradiators are unified, and a single right-angle mirror 806 is shared, so that the adjustment becomes unnecessary.

Although preferred embodiments of the present invention are described above, the embodiments described above are just examples of the present invention. For example, it is allowed that only the right-angle mirrors are unified, and a plurality of lenses are used. Four or more irradiators can also be used.

Figure 9:
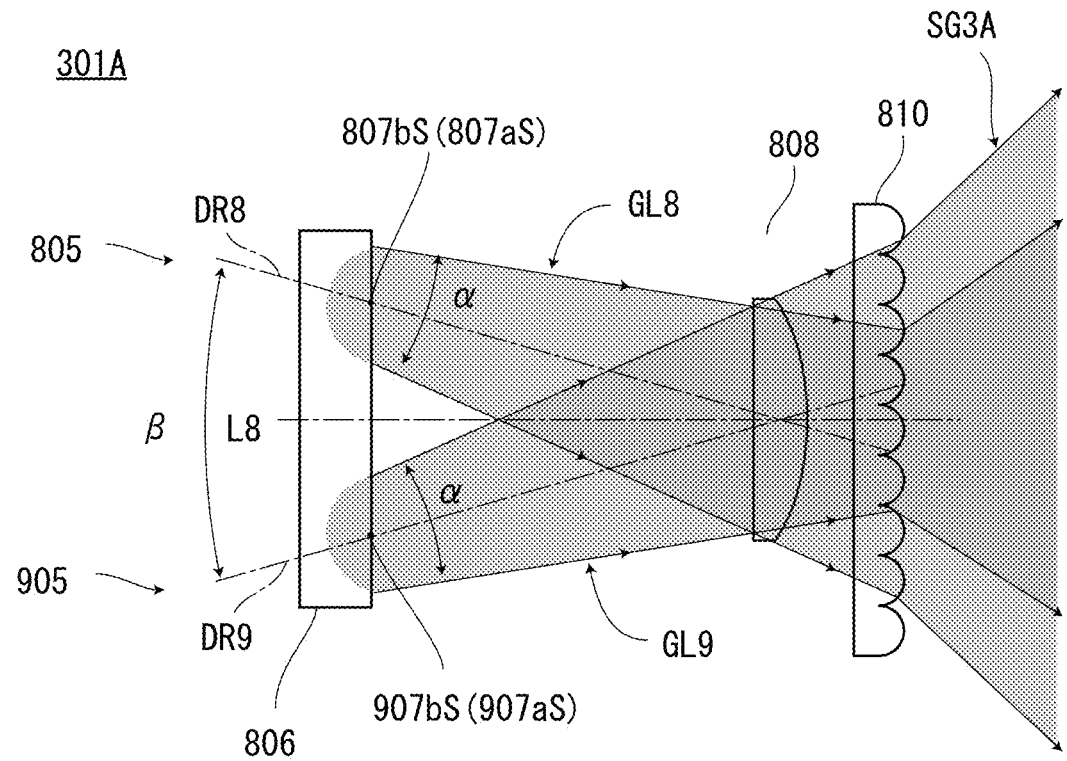
FIG. 9 is a modification of the same guide light irradiation device.

As a modification, a guide light irradiation device 301A is illustrated in FIG. 9. The guide light irradiation device 301A is configured by further adding a lenticular lens 810 to the guide light irradiation device 301. The lenticular lens has properties to diffuse light in one direction, and the lenticular lens 810 is disposed on an optical axis L8 in front of an exit surface of the lens 808 by being adjusted in direction so as to diffuse light in the up-down direction. Synthetic guide light SG3A emitted through the lenticular lens 810 extends longer in the vertical direction than the synthetic guide light SG3, so that the guide light irradiation device 301 enable use on a survey site with larger level differences.

Such a modification and combination can be made based on knowledge of a person skilled in the art, and are also included in the scope of the present invention.

REFERENCE SIGNS LIST

| | |
|---|---|
| 1, 101, 201, 301 | Guide light irradiation device |
| 5, 105, 205 | Irradiator |
| 6, 106, 206 | Right-angle mirror |
| 7a, 7b | Light-emitting diode |
| 8, 108, 208 | Lens |
| 9 | Housing |
| 7aS, 7bS, 107aS, 107bS, 207aS, 207bS | Light source |
| A | Assumed use distance |
| d | Distance |
| DR6 to DR9 | Irradiation direction |
| SG, SG1 to SG3 | Synthetic guide light |
| G, G1 to G9 | Guide light |
| L, L1 to L8 | Optical axis |
| α | Light diffusion angle in vertical direction |
| β | Angle (in vertical direction made between two irradiation directions) |

The invention claimed is:

1. A guide light irradiation device to irradiate guide light to indicate a direction to a survey operator, comprising:
a plurality of irradiators configured to each irradiate guide light visibly differing in pattern between a left and a right of a center based on a vertical plane that includes an optical axis of each irradiator,
wherein the plurality of irradiators are juxtaposed in a vertical direction so that their respective optical axes are in the vertical plane, and their optical axes make a predetermined angle with each other in the vertical direction in the vertical plane, and
wherein each of the irradiators includes a guide light, and synthetic light from the of guide lights irradiated from the respective irradiators is irradiated as a synthetic guide light.

2. The guide light irradiation device according to claim 1, wherein each of the irradiators including a pair of light sources configured to respectively emit lights for left and right patterns of the guide light, an optical member configured to form lights emitted from the pair of light sources as light differing in pattern between the left and the right, and a condenser lens configured to make the guide light exit.

3. The guide light irradiation device according to claim 1, wherein the predetermined angle between the optical axes of the plurality of irradiators is configured to be smaller than a light diffusion angle in the vertical direction in a single one of the irradiators.

4. The guide light irradiation device according to claim 1, wherein a disposition distance in the vertical direction between optical axes of the guide lights of the plurality of irradiators is selected such that an angle between line segments extending from optical axes of the guide lights to an assumed use distance of the guide lights becomes 1 arc-minute or less.

5. The guide light irradiation device according to claim 2, wherein respective condenser lenses of the guide lights of the plurality of irradiators are configured as a shared single one.

6. The guide light irradiation device according to claim 2, wherein respective optical members of the guide lights of the plurality of irradiators are configured as a shared single one.

7. A guide light irradiation device to irradiate guide light to indicate a direction to a survey operator, comprising:
a plurality of irradiators configured to each irradiate guide light differing in pattern between the left and the right of a center based on a vertical plane that includes an optical axis of each irradiator, each of the irradiators including a guide light,
wherein the plurality of irradiators are juxtaposed in a vertical direction so that their respective optical axes are in the vertical plane, and synthetic light of the guide lights irradiated from the respective irradiators is irradiated as a synthetic guide light, and
wherein each of the irradiators includes a pair of light sources configured to respectively emit lights for left and right patterns of the guide light, an optical member configured to form lights emitted from the pair of light sources as light differing in pattern between the left and the right, and a condenser lens configured to make the guide light exit.

* * * * *